US007129887B2

(12) United States Patent
Mitchell

(10) Patent No.: US 7,129,887 B2
(45) Date of Patent: Oct. 31, 2006

(54) AUGMENTED REALITY TRAFFIC CONTROL CENTER

(75) Inventor: Steven W. Mitchell, Manassas, VA (US)

(73) Assignee: Lockheed Martin MS2, Manassas, VA (US)

( * ) Notice: Subject to any disclaimer, the term of this patent is extended or adjusted under 35 U.S.C. 154(b) by 212 days.

(21) Appl. No.: 10/824,410

(22) Filed: Apr. 15, 2004

(65) Prior Publication Data

US 2005/0231419 A1 Oct. 20, 2005

(51) Int. Cl.
*G01S 13/93* (2006.01)

(52) U.S. Cl. ........................... 342/36; 342/41; 342/57; 342/176; 342/179; 342/52; 342/53; 342/54; 345/158

(58) Field of Classification Search ............ 342/29–37, 342/41, 52–58, 61, 90, 176–186, 195, 197; 345/8, 30, 156, 158, 419, 473
See application file for complete search history.

(56) References Cited

U.S. PATENT DOCUMENTS 5,432,895 A * 7/1995 Myers ........................ 345/419
5,751,260 A * 5/1998 Nappi et al. ................... 345/8
5,798,733 A * 8/1998 Ethridge ................ 342/357.08
5,886,822 A * 3/1999 Spitzer ........................ 359/630
6,023,372 A * 2/2000 Spitzer et al. .............. 359/630
6,084,367 A * 7/2000 Landert ....................... 318/466
6,198,462 B1 * 3/2001 Daily et al. ..................... 345/8
6,199,008 B1 * 3/2001 Aratow et al. .............. 701/120
6,215,498 B1 * 4/2001 Filo et al. ................... 345/419
6,222,677 B1 * 4/2001 Budd et al. ................. 359/630
6,243,076 B1 * 6/2001 Hatfield ...................... 345/156
6,275,236 B1 * 8/2001 Delahunty ................... 345/30
6,295,757 B1 10/2001 Fields, II
6,356,392 B1 * 3/2002 Spitzer ....................... 359/630
7,027,621 B1 * 4/2006 Prokoski ..................... 382/118
2004/0061726 A1 * 4/2004 Dunn et al. ................. 345/855
2005/0231419 A1 * 10/2005 Mitchell ...................... 342/36

OTHER PUBLICATIONS

"Hand gesture estimation and model refinement using monocular camera-ambiguity limitation by inequality constraints", Shimada, N. et al. Automatic Face and Gesture Recognition, Proceedings. Third IEEE Int'l Conf. on Apr.14-16 1998 pp.: 268-273.*
"SkyTools and DigiStrips: from the technology to the European operational context", Carlier, S.; Gawinowski, G.; Guichard, L.; Hering, H. Digital Avionics Systems, 2001. DASC. The 20th Conference, Oct. 2001 pp.: 7E1/1-7E1/7 vol. 2.*

(Continued)

*Primary Examiner*—John B. Sotomayor
(74) *Attorney, Agent, or Firm*—Venable LLP; Ralph P. Albrecht; Kavita B. Lepping

(57) ABSTRACT

In an exemplary embodiment, an augmented reality system for traffic control combines data from a plurality of sensors to display, in real time, information about traffic control objects, such as airplanes. The sensors collect data, such as infrared, ultraviolet, and acoustic data. The collected data is weather-independent due to the combination of different sensors. The traffic control objects and their associated data are then displayed visually to the controller regardless of external viewing conditions. The system also responds to the controller's physical gestures or voice commands to select a particular traffic control object for close-up observation or to open a communication channel with the particular traffic control object.

23 Claims, 3 Drawing Sheets

OTHER PUBLICATIONS

"Visual Gesture Recognition for Ground Air Traffic Control using the Radon Transform", Singh, M.; Mandal, M.; Basu, A. Intelligent Robots and Systems, (IROS 2005). IEEE/RSJ Int'l Conf. on Aug. 2-6, 2005 pp.: 2850-2855.*

Wendy E. Mackay and Anne-Laure Fayard, "Designing Interactive Paper, Lessons from three Augmented Reality Projects" (1999), available at http://citeseer.ist.psu.edu/mackay99designing.html.

Wendy E. Mackay et al., "Reinventing the Familiar: Exploring an Augmented Reality Design Space for Air Traffic Control" (1988), available at http://citeseer.ist.psu.edu/mackay98reinventing.html.

Lance Winslow, "Is your air traffic control person real?" no date, available at http://articles.pointshop.com/aviation/40686.php.

Fenella Saunders, "Future Tech: Virtual Realizy 2.0" (Sep. 1999) available at http://www.discover.com/sep_99/future.html.

Steven R. Ellis et al, "Augmented Reality Tower Tool" presented at Nasa Human Factors Symposium, Oct. 18-21, 2004, available at http://www.as.nasa.gov/hf_symposium/agenda.html.

Phil Scott, "A virtual reality control tower helps to test new runway designs and traffic patterns" *Scientific American*, Apr. 2000, available at http://www.sciam.com/article.cfm?articleID=0005471B-3E53-1C75-9B81809EC588EF21.

"Future Flight Central" no date, available at http://www.simlabs.arc.nasa.gov/ffc/ffc.html, last updated Nov. 11, 2005.

Stephane Chatty and Patrick Lecoanet, "Pen Computing for Air Traffic Control" *Proceeding of the SIGCHI conference on Human factors in computing systems* (1996), available at http://sigchi.org/chi96/proceedings/papers/Chatty/sc_txt.htm.

* cited by examiner

AUGMENTED REALITY TRAFFIC CONTROL CENTER

BACKGROUND OF THE INVENTION

1. Field of the Invention

The present invention relates generally to traffic control systems, and more particularly to air traffic control systems.

2. Related Art

Operations in conventional traffic control centers, such as, e.g., primary flight control on an aircraft carrier, airport control towers, and rail yard control towers, are severely impacted by reduced visibility conditions due to fog, rain and darkness, for example. Traffic control systems have been designed to provide informational support to traffic controllers.

Conventional traffic control systems make use of various information from detectors and the objects being tracked to show the controller where the objects are in two dimensional (2D) space. For example, an air traffic control center in a commercial airport, or on a naval aircraft carrier at sea, typically uses a combination of radar centered at the control center and aircraft information from the airplanes to show the controller on a 2D display, in a polar representation, where the aircraft are in the sky. Unfortunately, unlike automobile traffic control systems which deal with two dimensional road systems, air traffic adds a third dimension of altitude. Unfortunately, conventional display systems are two dimensional and the controller must mentally extrapolate, e.g., a 2D radar image into a three dimensional (3D) representation and also project the flight path in time in order to prevent collisions between the aircraft. These radar-based systems are inefficient, however, at collecting and conveying three or more dimensional data to the controller.

Conventional systems offer means to communicate with the individual aircraft, usually by selecting a specific communication channel to talk to a pilot in a specific airplane. This method usually requires a controller to set channels up ahead of time, for example, on an aircraft carrier. If an unknown or unanticipated aircraft enters the control space, the control center may not be able to communicate with it.

What is needed then is an improved system of traffic control that overcomes shortcomings of conventional solutions.

SUMMARY OF THE INVENTION

An exemplary embodiment of the present invention provides a traffic controller, such as an air traffic controller, with more data than a conventional radar-based air traffic control system, especially in conditions with low visibility such as low cloud cover or nightfall. The system can provide non-visual data, such as, e.g., but not limited to, infrared and ultraviolet data, about traffic control objects, and can display that information in real-time on displays that simulate conventional glass-window control tower views. In addition, the system can track the movements of the controller and receive the movements as selection inputs to the system.

In an exemplary embodiment, the present invention can be an augmented reality system, that may include a display; a sensor for collecting non-visual data associated with traffic control objects in a traffic control space; a computer receiving the data from the sensor, and operative to display the data on the display in real time; and means for detecting a physical gesture of a traffic controller selecting an traffic control object displayed on the display.

In an another exemplary embodiment, the present invention can be a method of augmented reality traffic control including collecting non-visual data associated with traffic control objects in a traffic control space; displaying the non-visual data in real time; and detecting a physical gesture of a traffic controller selecting one of the traffic control objects displayed.

Further features and advantages of the invention, as well as the structure and operation of various embodiments of the invention, are described in detail below with reference to the accompanying drawings.

DEFINITIONS

Components/terminology used herein for one or more embodiments of the invention are described below:

In some embodiments, "computer" may refer to any apparatus that is capable of accepting a structured input, processing the structured input according to prescribed rules, and producing results of the processing as output. Examples of a computer may include: a computer; a general purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer may have a single processor or multiple processors, which may operate in parallel and/or not in parallel. A computer may also refer to two or more computers connected together via a network for transmitting or receiving information between the computers. An example of such a computer may include a distributed computer system for processing information via computers linked by a network.

In some embodiments, a "machine-accessible medium" may refer to any storage device used for storing data accessible by a computer. Examples of a machine-accessible medium may include: a magnetic hard disk; a floppy disk; an optical disk, such as a CD-ROM or a DVD; a magnetic tape; a memory chip; and a carrier wave used to carry machine-accessible electronic data, such as those used in transmitting and receiving e-mail or in accessing a network.

In some embodiments, "software" may refer to prescribed rules to operate a computer. Examples of software may include: code segments; instructions; computer programs; and programmed logic.

In some embodiments, a "computer system" may refer to a system having a computer, where the computer may comprise a computer-readable medium embodying software to operate the computer.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF EXEMPLARY EMBODIMENTS OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 1:
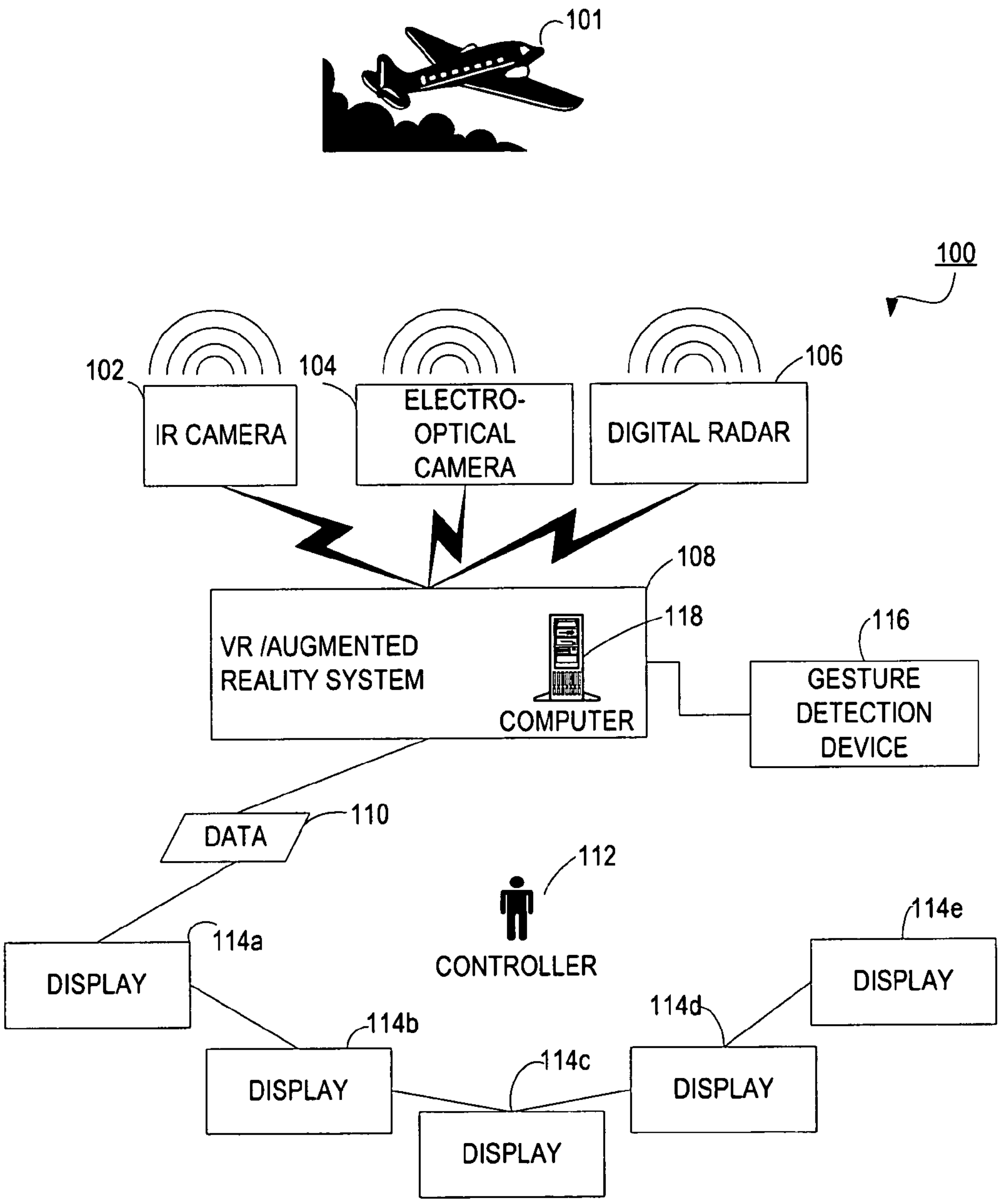
FIG. 1 depicts an exemplary embodiment of an augmented reality air traffic control system according to the present invention.
Figure 2:
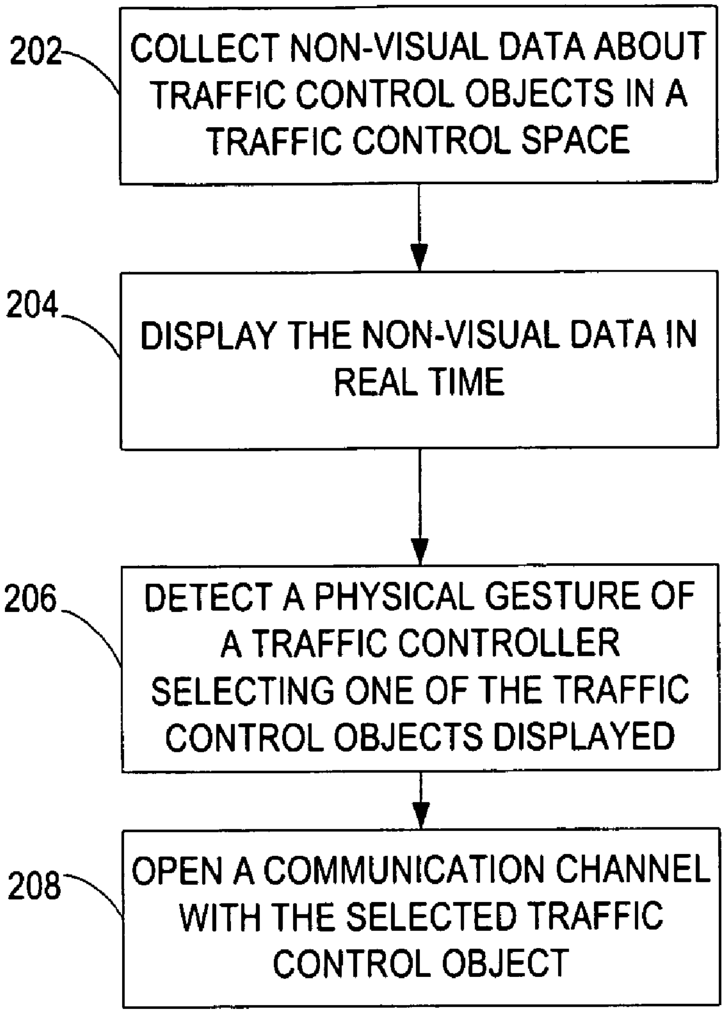
FIG. 2 depicts a flow chart of an exemplary embodiment of a method of augmented reality traffic control according to the present invention.

As seen in FIG. 1, in an exemplary embodiment, an air traffic control system 100 can use different types of sensors and detection equipment to overcome visibility issues. For example, the system 100 can use infrared (IR) cameras 102, electro-optical (EO) cameras 104, and digital radar 106, alone or in combination, to collect visual and non-visual data about an air traffic control object, such as, e.g., but not limited to, airplane 101. Additional sensors can include, e.g., but are not limited to, a radio-frequency image sensor, RADAR, LIDAR, a millimeter wave imaging sensor, an acoustic sensor, a digital infrared camera, a digital ultraviolet camera, and high-resolution radar. The sensor data may be provided to the virtual reality (VR) or augmented reality system 108, which may process with computer 118 the sensor data, and may display the data 110 in visual form to the controller 112, even when visibility is limited. In an exemplary embodiment, the data 110 can be presented to the controller 112 in an immersive virtual reality (VR) or augmented reality system 108 using large flat panel displays 114*a–e* (collectively 114) in place of, or in addition to, glass windows, to display the data 110 in a visual format. Then, regardless of the external conditions, the controller 112 can see the flight environment as though the weather and viewing conditions were bright and clear. In another exemplary embodiment, the data 110 can be displayed to the controller 112 in a VR helmet worn by the controller 112, or other display device.

An exemplary embodiment of the present invention can also make use of augmented reality (AR) computer graphics to display additional information about the controlled objects. For example, flight path trajectory lines based on an airplane's current speed and direction can be computed and projected visually. The aircraft (or other control objects) themselves can be displayed as realistic airplane images, or can be represented by different icons. Flight information, such as, e.g., but not limited to, flight number, speed, course, and altitude can be displayed as text associated with an aircraft image or icon. Each controller 112 can decide which information he or she wants to see associated with an object. The AR computer system 108 can also allow a controller 112 to zoom in on a volume in space. This is useful, for example, when several aircraft appear "stacked" too close together on the screen to distinguish between the aircraft. By zooming in, the controller 112 can then distinguish among the aircraft.

An exemplary embodiment of the present invention can also provide for controller input such as, e.g., but not limited to, access to enhanced communication abilities. A controller 112 can use a gesture detection device 116 to point, for example, with his or her finger, to the aircraft or control object with which he or she wants to communicate, and communication may be opened with the aircraft by the system. The pointing and detection system 116 can make use of a number of different known technologies. For example, the controller 112 can use a laser pointer or a gyro-mouse to indicate which aircraft to select. Alternatively, cameras can observe the hand gestures of the controller 112 and feed video of a gesture to a computer system that may convert a pointing gesture into a communication opening command or other command. The controller 112 can alternatively wear a data glove that can track hand movements and may determine to which aircraft the controller is pointing. Alternatively, the gesture detection device 116 may be a touch-sensitive screen.

In addition to the various exemplary sensors 102–106 that may be used as inputs to the system 108, the various exemplary sensors 102–106 track objects of interest in the space being controlled. Information from other sources (such as, e.g., but not limited to, flight plans, IFF interrogation data, etc.) can be fused with the tracking information obtained by the sensors 102–106. Selected elements of the resulting fused data can be made available to the controllers 112 through both conventional displays and through an AR or VR display 110, 114 which may surround the controller 112. The location and visual focus of the controller 112 can be tracked and used by the system 108 in generating the displays 110, 114. The physical gestures and voice commands of controller 112 can also be monitored and may be used to control the system 108, and/or to link to, e.g., but not limited to, an external communications system.

In an exemplary embodiment, the detected physical gesture of the controller 112 may be used to open a computer data file containing data about the selected air traffic control object. The computer data file may be stored on, or be accessible to, computer 118. The data in the computer data file may include, for example, a passenger list, a cargo list, or one or more physical characteristics of the selected air traffic control object. The physical characteristics may include, but are not limited to, for example, the aircraft weight, fuel load, or aircraft model number. The data from the computer data file may then be displayed as a textual annotation on the display 114.

In an exemplary embodiment, the present invention can be used, for example, for augmenting a conventional aircraft carrier Primary Flight (PriFly) control center. A PriFly center can use head-mounted display technology to display track annotations such as, e.g., but not limited to, flight number, aircraft type, call sign, and fuel status, etc., as, e.g., a text block projected onto a head mounted display along a line of sight from a controller 112 to an object of interest, such as, e.g., but not limited to, an aircraft. For example, the head mounted display can place the information so that it appears, e.g., beside the actual aircraft as the aircraft is viewed through windows in daylight. At night or in bad weather, the same head mounted display can also be used to display, e.g., real-time images obtained by exemplary sensors 102–106, such as, e.g., but not limited to, an infrared camera 102 or low light level TV camera imagery at night, to provide the controller 112 with the same visual cues as are available during daylight.

In an exemplary embodiment, a position, visual focus, and hand gestures of the controller 112 can be monitored by, e.g., a video camera and associated processing system, while voice input might be monitored through, e.g., a headset with a boom microphone. In addition to visual focus, voice commands, and hand gestures being used to control the augmented reality control tower information processing system 100, a controller 112 can point or stare at a particular aircraft (which might be actually visible through the window or projected on the display) and may order the information processing system 108 via gesture detection device 116 to, e.g., open a radio connection to that aircraft. Then the controller 112 could, e.g., talk directly to the pilot of the aircraft in question. When the controller 112 is finished talking with that pilot, another voice command or a keyboard command, or other input gesture could close the connection. Alternatively, for aircraft with suitable equipment, the controller 112 can dictate a message and then tell the information processing system to transmit that message to a particular aircraft or group of aircraft. Messages coming back from such an aircraft could be displayed, e.g., beside the aircraft as a text annotation, or appear in a designated display window.

An exemplary embodiment can use an immersive virtual reality (VR) system 108 to present and display sensor 102–106 imagery and computer augmentations such as, e.g., text annotations. Such a system can completely replace a conventional control center along with its windows.

An exemplary embodiment of the present invention can also be used to control, e.g., train traffic at train switching yards and crossings. Similarly, the immersive VR system 108 may be used in other traffic control management applications.

Figure 3:
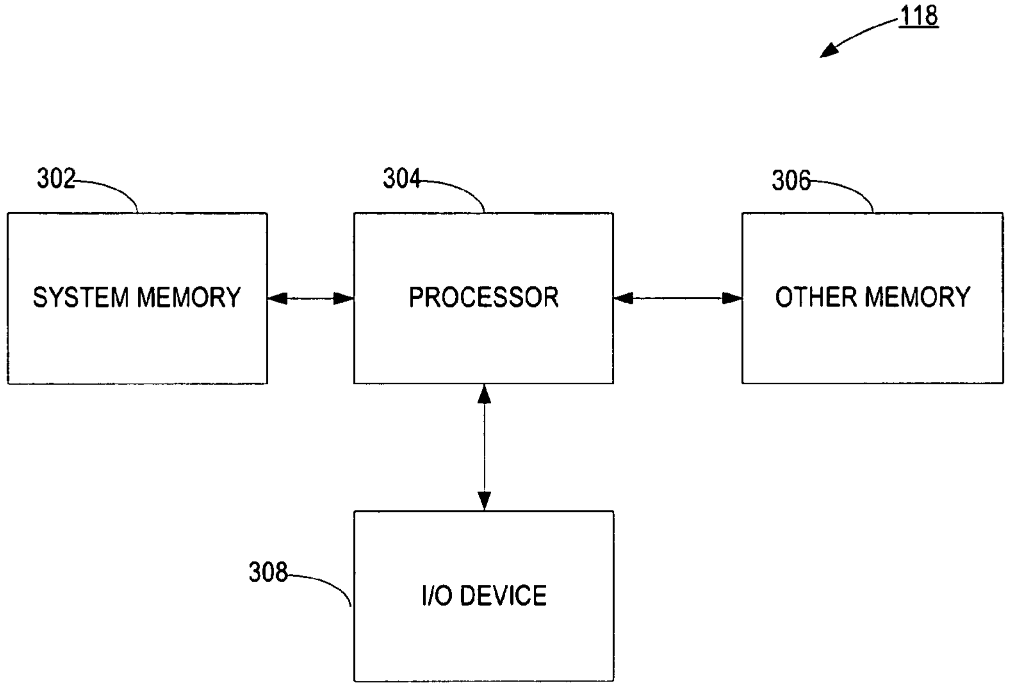
FIG. 3 depicts a conceptual block diagram of a computer system that may be used to implement an embodiment of the invention.

Some exemplary embodiments of the invention, as discussed above, may be embodied in the form of software instructions on a machine-accessible medium. Such an exemplary embodiment is illustrated in FIG. 3. The computer system 118 of FIG. 3 may include, e.g., but not limited to, at least one processor 304, with associated system memory 302, which may store, for example, operating system software and the like. The system may further include additional memory 306, which may, for example, include software instructions to perform various applications and may be placed on, e.g., a removable storage media such as, e.g., a CD-ROM. System memory 302 and additional memory 306 may be implemented as separate memory devices, they may be integrated into a single memory device, or they may be implemented as some combination of separate and integrated memory devices. The system may also include, e.g., one or more input/output (I/O) devices 308, for example (but not limited to), keyboard, mouse, trackball, printer, display, network connection, etc. The present invention may be embodied as software instructions that may be stored in system memory 302 or in additional memory 306. Such software instructions may also be stored in removable media (for example (but not limited to), compact disks, floppy disks, etc.), which may be read through other memory 306, or an I/O device 308 (for example, but not limited to, a floppy disk drive). Furthermore, the software instructions may also be transmitted to the computer system via an I/O device 308, including, for example, a network connection; in this case, the signal containing the software instructions may be considered to be a machine-accessible medium.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A augmented reality system, comprising:

a display for use by an air traffic controller in an operations center on a water-based craft;

a sensor for collecting data associated with air traffic control objects in a traffic control space;

a computer receiving said data from said sensor, and operative to display said data on said display to the air traffic controller in the operations center in real time; and means for detecting a physical gesture of the air traffic controller in the operations center selecting an traffic control object displayed on said display of the air traffic controller.

2. The system of claim 1, further comprising means for displaying flight data about said air traffic control objects on said display.

3. The system of claim 2, wherein said flight data comprises at least one of a trajectory, heading, altitude, speed, call sign, and/or flight number.

4. The system of claim 1, further comprising means for opening a communication channel to said selected air traffic control object.

5. The system of claim 1, wherein said display comprises a plurality of displays arranged to simulate a plurality of windows in an air craft carrier primary flight (PriFly) control tower.

6. The system of claim 1, further comprising:

means for opening a computer data file containing data about said selected air traffic control object; and means for displaying said data as a textual annotation on said display.

7. The system of claim 6, wherein said data about said selected air traffic control object comprises at least one of: a passenger list or a physical characteristic of said selected air traffic control object.

8. The system of claim 1, wherein said physical gesture to be detected comprises at least one of a hand gesture, a pointing gesture, a voice command, a sustained visual look, and/or a change of visual focus.

9. The system of claim 1, wherein said sensor comprises at least one of an infrared image sensor, a radio frequency image sensor, RADAR, LIDAR, a millimeter wave imaging sensor, an acoustic sensor, a digital infrared camera, a digital ultraviolet camera, an electro-optical camera, digital RADAR, and/or high-resolution radar.

10. The system of claim 1, wherein said display comprises a virtual reality helmet.

11. The system of claim 1, wherein said traffic control space is an aircraft carrier air traffic control space.

12. The system of claim 1, wherein said means for detecting comprise a laser pointer, a gyro-mouse, a video observation system, a data glove, a touch-sensitive screen, and/or a voice observation system.

13. The system of claim 1, wherein said data collected by said sensor comprises non-visual data.

14. The system of claim 1, wherein the water-based craft is an aircraft carrier.

15. A method, comprising:

(a) collecting data associated with air traffic control objects in an air traffic control space;

(b) displaying said data to an air traffic controller in an operation center on a water-based craft in real time; and (c) detecting a physical gesture of the traffic controller selecting one of said air traffic control objects displayed.

16. The method of claim 15, further comprising:

(d) opening a communication channel with said selected air traffic control object.

17. The method of claim 15, further comprising:

(d) displaying flight data about said air traffic control objects.

18. The method of claim 17, wherein (d) comprises displaying at least one of a trajectory, heading, altitude, speed, call sign, and/or flight number.

19. The method of claim 15, further comprising:

opening a computer data file containing data about said selected air traffic control object; and displaying said data as a textual annotation on said display.

20. The method of claim 15, wherein (a) comprises collecting said data from at least one of an infrared image sensor, a radio frequency image sensor, RADAR, LIDAR, a millimeter wave imaging sensor, an acoustic sensor, a digital infrared camera, a digital ultraviolet camera, digital RADAR, and electro-optical camera, and/or high-resolution radar.

21. The method of claim 15, wherein (c) comprises detecting at least one of a hand gesture, a pointing gesture, a voice command, a sustained visual look, and/or a change of visual focus.

22. The method of claim 15, wherein (b) comprises displaying said data on at least one of a plurality of displays arranged to simulate a plurality of windows in a flight control tower, and/or a virtual reality helmet.

23. The method of claim 15, wherein (a) comprises collecting non-visual data associated with traffic control objects in the traffic control space.

* * * * *